May 14, 1957    J. H. MERCIER    2,792,022
CLAMPING MEANS FOR BLADDER OF PRESSURE ACCUMULATOR
Filed May 10, 1955
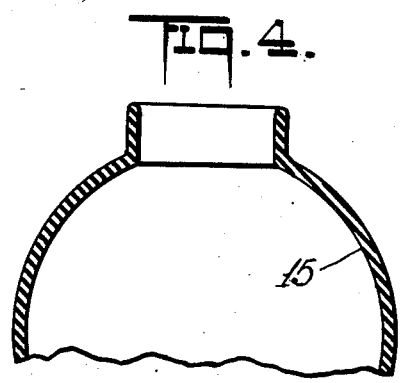
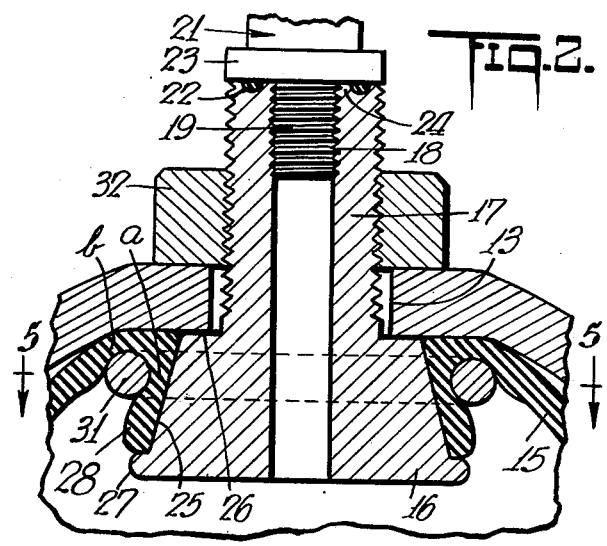
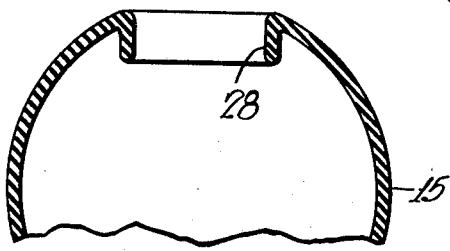
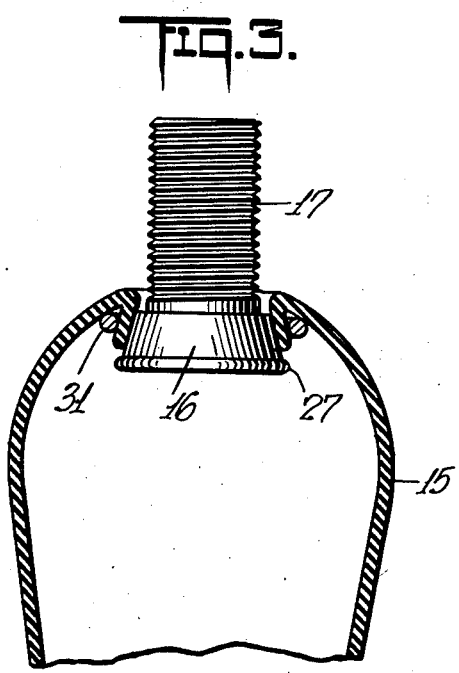
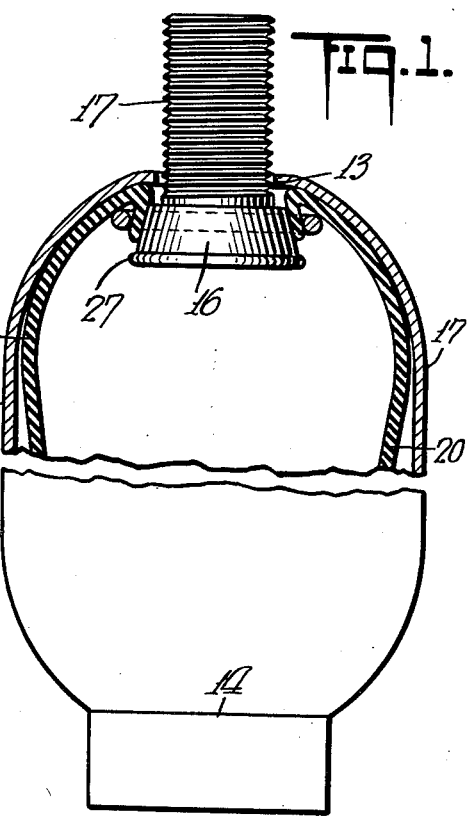
INVENTOR
JACQUES H. MERCIER
BY
Dean Fairbank & Hirsch
ATTORNEYS United States Patent Office 2,792,022
Patented May 14, 1957

2,792,022

CLAMPING MEANS FOR BLADDER OF PRESSURE ACCUMULATOR

Jacques H. Mercier, New York, N. Y., assignor to Greer Hydraulics, Inc., a corporation of New York Application May 10, 1955, Serial No. 507,339

6 Claims. (Cl. 138—30)

It is among the objects of the invention to provide clamping means for the bladder of a pressure accumulator, which clamping means has but few parts that may readily be fabricated at low cost and which is strong and durable and not likely to become deranged and which may readily be assembled, securely to clamp the periphery of the mouth of the bladder without likelihood of injury thereto so that when the clamping means is affixed to the gas inlet port of the accumulator shell a dependable seal will be provided to prevent leakage between the gas and liquid chambers of the accumulator defined by the bladder and also to prevent leakage from the interior of the accumulator and which clamping means may readily be disassembled for removal of a defective bladder.

According to the invention, these objects are accomplished by the arrangement and combination of elements hereinafter described and particularly recited in the claims.

In the accompanying drawings in which are shown one or more of various possible embodiments of the several features of the invention, Fig. 1 is a longitudinal sectional view of a pressure accumulator incorporating one embodiment of the bladder clamping means, Fig. 2 is a fragmentary detailed view on a greatly enlarged scale of the clamping means in assembled position, Fig. 3 is a view similar to Fig. 2 of the clamping means in partially assembled position, Fig. 4 is a fragmentary detailed view of the bladder in reversed position, and Fig. 5 is a view similar to Fig. 4 of the bladder ready for installation.

Referring now to the drawings, the pressure accumulator shown in Fig. 1 comprises a shell or container 12, preferably substantially cylindrical as shown and having axially aligned ports 13 and 14 at each end. The invention resides in the means to retain the bladder 15 in position in the shell. As is clearly shown in Figs. 2 and 3, such means comprises a circular plate or disc 16 which has a stem 17 rising therefrom and preferably formed integral therewith. Extending through the stem and disc is an axial bore 18 which is desirably internally threaded at its outer end to receive the correspondingly threaded end 19 of an air valve 21, which may be a conventional "Schraeder" valve. Desirably, a resilient seal ring 22, such as an O ring, encompasses the end 19 of the valve 21 and is compressed between the flange 23 of the valve and the end 24 of the stem to prevent leakage of air. The side wall 25 of the disc 16 is substantially conical being bevelled outwardly as shown at an angle of say 15 degrees from its top wall 26, which defines an annular shoulder, to the annular flange 27 at its lower edge.

The bladder 15 which is of resilient deformable material which may be natural or synthetic rubber or suitable plastic having like characteristics, is desirably substantially conical in contour and has an inturned annular rim 28 at its mouth, the wall of said rim extending substantially parallel to the longitudinal axis of the bladder when the bladder is not assembled into the unit.

The diameter of the disc 16 is such that when positioned in the inturned rim 28 of the bladder 15, such rim will rest on the bevelled or inclined side wall 25 of the disc as shown in Fig. 2 and such inturned rim is of length such as to extend substantially from the flange 27 to slightly above the shoulder 26. Encompassing the rim 28 and the side wall 25 of disc 16 is a ring member 31 of any suitable material such as plastic or metal and illustratively shown as of steel, the inner diameter of said member 31 illustratively being slightly less than the outer diameter of flange 27. Thus, when a nut 32 is screwed on the externally threaded stem 17 which extends through the port 13 of the container, the rim 28, the disc 16 and the container 12 will be securely retained in assembled relationship.

To assemble the unit the ring 31 is positioned so as to encompass the disc 16, and the inturned rim 28 of the bladder 15 is then positioned between the side wall 25 of the disc and the ring 31 as shown in Fig. 3.

The unit as thus assembled is then positioned in the container, through the port 14, which is large enough to permit passage of such unit, with the stem 17 extending through the port 13. Thereupon, the nut 32 is screwed on the threaded end of the stem and tightened until the shoulder 26 of the disc 16 abuts against the inner surface of the container shell around port 13. As the nut 32 is tightened and the disc 16 moves upwardly, the ring 31 will force the portion a of the inturned rim 28 and the adjacent portion b of the wall of the bladder with which it is in contact, against the inclined wall 25 of the disc 16 and the wall of the container respectively, securely to retain such portions a and b against said disc and said container wall, to effect dependable seals to prevent leakage of air from the bladder and of liquid from the container between the bladder and container wall.

By reason of the abutment of shoulder 26 against the wall of the container about port 13 when nut 32 is tightened, which limits the movement of the disc 16, the ring 31, which wedges the contacting portions a and b of the rim 28 and bladder wall against the wall 25 of the disc and the wall of the container, will be substantially floating between a mass of resilient material and will be in a position of equilibrium so that the pressures exerted thereby against the contacting portions of the bladder rim and the bladder wall will be substantially equal. Hence, although a dependable sealing action will be provided, there will be no cutting of the bladder material by the ring which would cause failure of the bladder.

In use of the unit when a gas such as air under pressure is forced into the bladder in conventional manner, as the pressure on the side of the inturned rim 28 in contact with the wall 25 of the disc 16 is substantially atmospheric and as the pressure on the other side of the rim which is exposed to the pressure of the air in the bladder is much greater, the rim 28 will also be retained against the side wall 25 of the disc by such differential in pressure to enhance the sealing action.

Although the bladder 15 may be made in any conventional manner, in the illustrative embodiment shown, it is desirably molded with the rim 28 thereof extending outwardly as shown in Fig. 4 parallel to the longitudinal axis of the bladder. After the molding and curing operation, the bladder may then be turned inside out to assume the position shown in Fig. 5, which is the position of the bladder as it is used in the unit.

With the construction above described, secure clamping of the bladder is provided without likelihood of leakage of liquid or gas from the accumulator. In the event of bladder failure, which necessitates replacement, as the bladder is releasably retained by the clamping means, it may readily be removed and as the same clamping means are available for reuse, the cost of bladder replacement is considerably less than it would be if the clamping means, including the disc and stem were permanently mounted to the bladder.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment of the character described for use with a pressure accumulator of the type having a rigid container with a port and a deformable bladder of resilient material in said container having a mouth with an inturned annular rim, said equipment comprising means to secure the bladder in the container, said means comprising a disc having a stem rising therefrom and adapted to extend through such port, said disc having a side wall inclined outwardly from the top thereof to the bottom thereof against which said rim is positioned, and a ring member encompassing said disc and said inturned annular rim, said ring member being of inner diameter greater than at least a portion of the side wall of the disc and less than the outer diameter of the inturned rim at the portion thereof resting against the aforementioned portion of the side wall of the disc, whereby when said disc is moved toward the port of said container the inturned rim and adjacent portion of the bladder will be wedged by said ring member against the side wall of said disc and the adjacent wall of said container.

2. The combination set forth in claim 1 in which said stem defines an annular shoulder with respect to the adjacent surface of said disc and a nut is screwed on the portion of said stem extending through such port.

3. The combination set forth in claim 1 in which the inner diameter of said ring member is less than the maximum outer diameter of said disc.

4. The combination set forth in claim 1 in which said disc has an annular flange at the bottom thereof and the inner diameter of said ring is less than the outer diameter of said flange.

5. Clamping means of the character described comprising a disc of rigid material having a stem rigid therewith and extending therefrom, the periphery of said disc being bevelled outwardly from the portion thereof adjacent the stem to the opposed portion thereof, and a ring member of diameter such as to encompass the bevelled portion of said disc.

6. Clamping means of the character described comprising a disc of rigid material having a stem rigid therewith and extending outwardly therefrom, said stem defining an annular shoulder with respect to the adjacent portion of said disc, the periphery of said disc being bevelled outwardly from the portion thereof adjacent the stem to the opposed portion thereof, and a ring member of rigid material of inner diameter slightly less than the maximum outer diameter of said disc.

References Cited in the file of this patent

UNITED STATES PATENTS

| | | |
|---|---|---|
| 1,464,107 | Pedersen | Aug. 7, 1923 |
| 1,580,824 | Gothier | Apr. 13, 1926 |
| 2,710,630 | Greer | June 14, 1955 |